United States Patent [19]
Eilertson

[11] Patent Number: 4,690,183
[45] Date of Patent: Sep. 1, 1987

[54] SELF-PROPELLED STUMP CUTTER

[76] Inventor: Donald M. Eilertson, 1109 Trinidad La., Garland, Tex. 75040

[21] Appl. No.: 791,734

[22] Filed: Oct. 28, 1985

[51] Int. Cl.⁴ ............................................. A01G 23/06
[52] U.S. Cl. ..................................... 144/2 N; 37/2 R
[58] Field of Search ................. 144/2 N; 37/2 R, 2 P, 37/94; 299/75

[56] References Cited

U.S. PATENT DOCUMENTS

| | | | |
|---|---|---|---|
| 2,912,022 | 11/1959 | Ver Ploeg et al. | 144/2 |
| 3,198,224 | 8/1965 | Hiley | 144/2 N |
| 3,336,958 | 8/1967 | Carlton | 144/2 |
| 3,568,740 | 3/1971 | Speakman | 144/2 |
| 3,685,557 | 8/1972 | Groce | 144/2 N |
| 4,074,447 | 2/1978 | Shivers, Jr. et al. | 144/2 N |
| 4,271,879 | 6/1981 | Shivers, Jr. et al. | 144/2 N |

FOREIGN PATENT DOCUMENTS 996007  8/1976  Canada ............................. 144/2 N Primary Examiner—W. D. Bray
Attorney, Agent, or Firm—Hubbard, Thurman, Turner & Tucker

[57] ABSTRACT

A self-propelled stump cutter adapted to move under its own power to maneuver into small spaces where stumps might be located close to buildings or to other trees. The device includes a frame with a plurality of hydraulic means to steer the cutting wheel over the stump and to raise and lower the wheel. Hydraulic motors are also used to propel the device.

16 Claims, 8 Drawing Figures

SELF-PROPELLED STUMP CUTTER

BACKGROUND AND SUMMARY OF THE INVENTION

This invention pertains to devices for shredding stumps of trees and more particularly to such a device which can be maneuvered into small spaces, close to buildings or other trees or the like.

Most stump cutters are trailer-mounted, adapted to be pulled by a pickup truck, or an automobile. Such devices are customarily quite large, having carrier wheels spaced at a distance about equal to or greater than those of the pulling device. This is needed because the cutting wheel normally travels between the carrier wheel spacing and that travel needs to be sufficient to traverse the stump to be removed.

By my invention I provide a small device adapted to be transported on a trailer. However, it is a self-propelled device and when unloaded can be driven precisely to almost any stump and because of its extension, it can be extremely flexible so far as location of the stump is concerned. It is very compact so as to be easily transported and very maneuverable to reach into difficult locations.

A special arrangement of teeth on the cutting wheel also enhances the shredding ability and quick operation of the device.

FIGURES

Figure 3:
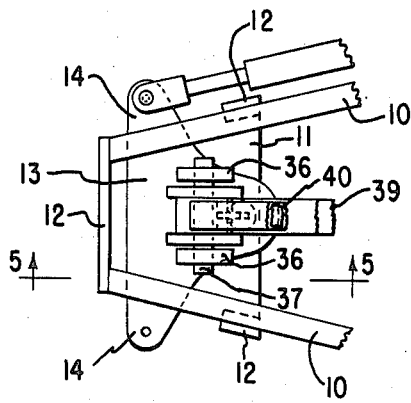
Figure 4:
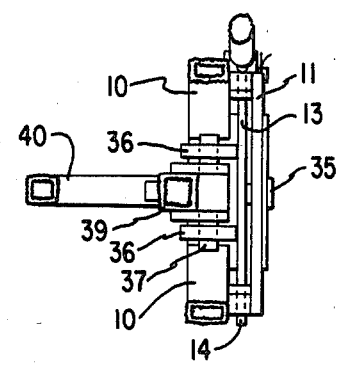
Figure 5:
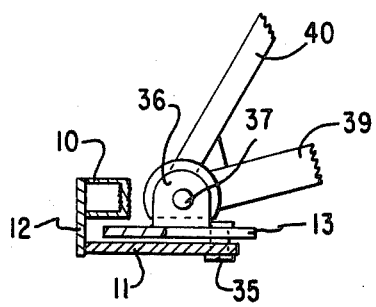
Figure 6:
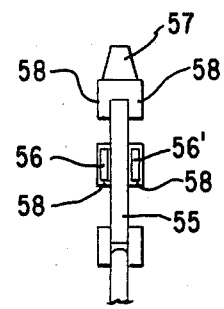
Figure 8:
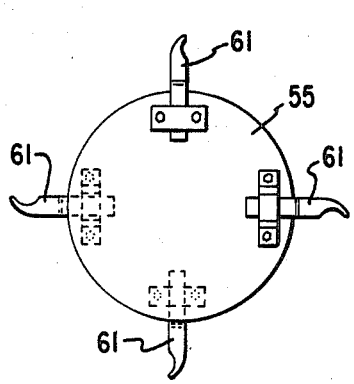
Figure 7:
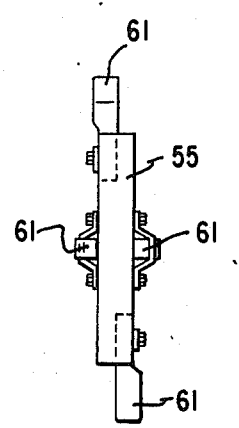

FIG. 3 is a detailed plan view, to an enlarged scale, of the structure at the swivel joint for the cutter carrier structure, FIG. 4 is an end view of the structure of FIG. 3, FIG. 5 is a sectional view from line 5—5 of FIG. 3, FIG. 6 is a view to an enlarged scale of the edge of the cutter wheel, FIG. 7 is a view similar to FIG. 6 of an alternate wheel using a different mounting means for the teeth, and FIG. 8 is a side view of the wheel of FIG. 7.

DESCRIPTION

Briefly my invention comprises a stump cutter having the capability of self-propulsion and using a swinging cutter designed so that the cutter may be relatively narrow while retaining the ability to cut a relatively large stump. I also provide a novel cutting wheel to increase the speed of shredding the stump.

More specifically, and referring to the drawings, my device is mounted on a frame composed of two legs 10 arranged in V-shape and held in that position by a gusset plate 11 attached to the legs 10 by a web 12 (FIG. 5). This web extends from each leg 10 to the edge of the plate 11, but is omitted on both sides for a distance to form a slot on each side. Thus a support plate 13 having ears 14 can be pivotally moved relative to the plate 11. A further description of this function is provided later in this description part of the specification.

The end of the legs 10 opposite the plate 11 carry carrier wheels 15. These wheels are mounted on brackets 16 pivoted to the leg by pins 17. The bracket includes extensions 18 and 18' extending from the pivot point in directions diametrically opposite to each other.

Figure 1:
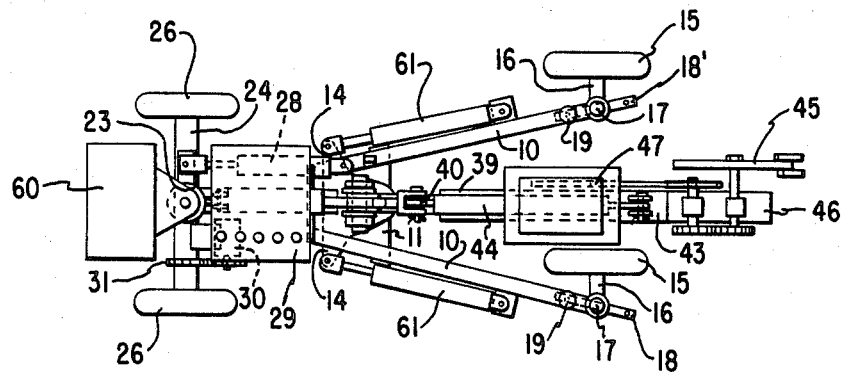
FIG. 1 is a top plan view of the device of my invention.

A holding pin 19 engaged between the leg 10 and one of the extensions is adapted to hold the wheel supporting bracket in position either outside of the frame as shown on one of the legs 10 in FIG. 1 or on the inside of the frame as shown by the other leg 10 of FIG. 1. Thus, the wheels 15 can be spread wide with both outside the frame for stability while cutting a stump or can both be retracted for compactness while being maneuvered into place in a narrow spot. For transportation, the wheels may be in either position, although I prefer to spread them apart for stability.

At the juncture of the legs 10 the frame includes a yoke member 20 fixed to the legs. This member extends diagonally upward for a small distance and then horizontally. At the end of the horizontal part 22 I provide a socket 23 in which a post 25 on an axle 24 is journalled for pivotal motion. This axle then can be turned to steer the device. Wheels 26 are journalled on the axle 24. Thus the axle 24 becomes a steerable axle. It is envisioned that a single wheel could be used at this point, but for stability I prefer to use a longer axle with wheels at each end.

Figure 2:
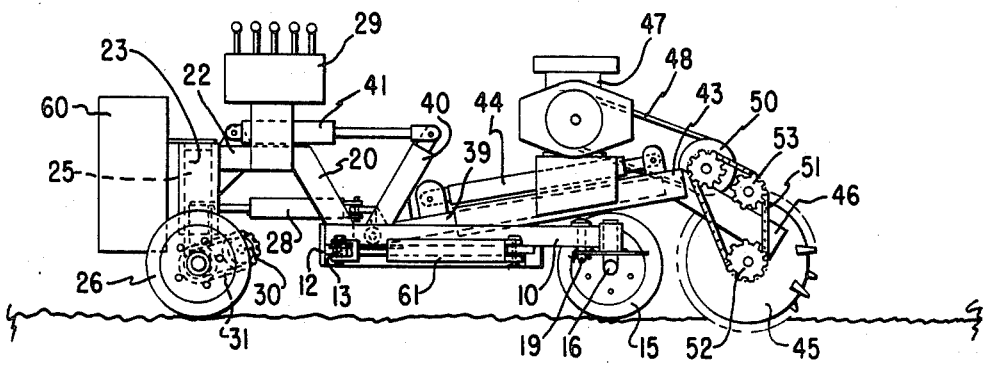
FIG. 2 is a side elevational view of the device of FIG. 1.

Steering may be accomplished by use of hydraulic cylinder and piston means. This is illustrated in FIGS. 1 and 2 by the hydraulic assembly 28 connected between the axle 24 and the frame near the end of the leg 10. Control may be from a central control panel 29 mounted on the yoke 20.

Drive means for at least one wheel 26 is also provided. I prefer to use a driven axle with the wheels fixed to the axle and the axle journalled in a tubular journal. However, the drive could be to a single wheel or to both wheels. In the embodiment shown I use a hydraulic motor 30 to drive a belt or chain 31 which, in turn, drives the axle. Where two wheels are driven, they may be linked by what is known as "Positraction" for better traction where necessary. It will also be obvious that other types of drive could be used. Control of the motor 30 is also from the control panel 29.

The cutting mechanism and its motion control is mounted on the frame. In essence, the mounting is the pivotally mounted plate 13. As best shown in FIGS. 3, 4 and 5, this plate is pivoted on the frame at the gusset plate 11 by a pin 35. The elevating mechanism is pivotally mounted on the support plate 13 by means of a yoke having two upstanding ears 36 in which a horizontal pivot pin 37 is mounted.

The cutting mechanism is mounted on a V-shaped member which includes a carrying arm 39 and a raising lever 40. These members are formed into a rigid single member having separate functions. The vertical position of the carrying arm 39 is controlled by the position of the lever 40. That position, in turn, is controlled by a hydraulic piston and cylinder assembly 41 (FIG. 2). That assembly 41 is attached pivotally to the lever 40 and to the frame horizontal member 22. Both of those connections are somewhat loose in order to allow some moderate lateral movement of the arm 39 without binding.

In order to provide added flexibility in positioning the cutter, I prefer that the arm 39 be a telescoping device having a telescoping member 43 slidably engaged with the arm 39. The relative positions of these two members may be controlled by use of another hydraulic assembly 44. Both this mechanism 44 and the assembly 41 may also be controlled from the panel 29.

The cutting mechanism is mounted on the extended telescoping member 43. It includes a cutter wheel 45 rotatably mounted on a depending branch 46 of the member 43. The motor 47 which drives the wheel is also mounted on the member 43 so that there is always a fixed space between the two units. Preferably I use a belt drive 48 from the motor 47. This type of drive absorbs some of the cutting shock from the wheel 45 so that the motor does not have the direct shock, but that those intermittent forces will be somewhat damped. I illustrate, and prefer to use an idler 50 between the motor 47 and the final drive to the wheel 46. This allows for a change in the direction of the drive, as well as allowing for some additional speed modification. Controls for the motor 47 may also be mounted on the control panel 29 so that all controls are located at the same place on the machine. This motor also includes the hydraulic pump which provides pressure to all the hydraulic units shown.

I show the final drive as a chain 51 driving a sprocket 52 on the same axle as the cutting wheel 46. A tension idler 53 may also be used to keep proper tension in the chain.

My cutter wheel is also novel. I have discovered that by using a relatively heavy wheel so that the fly wheel effect is augmented, and by using alternately staggered teeth, I can provide for cutting a much wider kerf across the stump and can therefor chip the stump away considerably faster than with previous types of cutters. As shown in FIG. 6, I provide a disk 55 of steel or the like, thus providing for the flywheel effect. On the periphery of the disk, I use cutting teeth which may cut on either side of the disk as the teeth 56 and 56'. Another set of teeth 57 is mounted on the disk 55 to cut the material between the places cut by the teeth 56 and 56'. Flanges 58 may be used to hold the teeth to the disk, and all of the teeth are variably mounted on the flanges. The exterior teeth 56 and 56' are mounted to one side of the flanges so that these flanges will not cause interference with the portion of the stump not cut away, and thus I provide an easily removable and replaceable tooth as well as a more efficient cutting wheel. It will be obvious that although I have illustrated the teeth 56 and 56' to be mounted together at a single location on the periphery of the wheel, that they, too, could be located in staggered positions around the periphery.

The alternate wheel shown in FIGS. 7 and 8 is very similar to that shown in FIG. 6 except for the mounting of the staggered teeth. In this embodiment, the teeth 61 are all formed the same, and are mounted in sets of four. One tooth of each set is mounted in a socket formed across about half the thickness of the disk 55 on one side. A second tooth is mounted similarly in a socket across about the half of the thickness opposite to the first. The third and fourth teeth are mounted similarly on the exterior faces of the disk 55 on opposite sides. Thus, the coverage of the cutter is similar to that first described.

In use, I prefer to carry my device on a trailer for transportation from one site to another. For that purpose, I pivot both wheels 15 to the outer position in which each wheel is outside the leg 10 to which it is attached. This provides for a stable and easily transported device. If necessary to keep the machine within a given width of trailer, either or both wheels could be turned inward for transport.

On getting to the site where stumps are to be removed, the machine is unloaded and if necessary to get into a tight place the position of the wheels 15 may be reversed to provide a narrow machine capable of getting into narrow areas. Otherwise, the wheels are left spread to provide a broad stable base from which to operate. The motor 47 may then be started to provide motive power through the hydraulic motor 30 and steering through operation of the hydraulic piston-cylinder assembly 28. The operator, walking alongside the machine may handle the controls on the panel 29 to position the cutting wheel properly over the stump. That positioning may also be made easier by being able to extend the telescoping arms 39 and 43. In order to prevent tipping when that arm is extended I may also provide a counterweight 60 to be attached to the end of the device opposite the cutter.

When the device is properly positioned, a clutch (not shown) on the motor may be engaged to cause the wheel 45 to be driven. The controls may then lower the wheel 45 through operation of the hydraulic device 41 until it starts cutting into the stump. Lateral movement is provided by pivoting the plate 13 through operation of hydraulic devices 61 (FIGS. 1 and 2) connected between the ears 14 on the plate 13 and the legs 10 of the frame. Motion of these hydraulic devices is controlled similarly to all other systems from the panel 29, and if two piston and cylinder assemblies are used, as shown, the systems may be interlocked so that only a single control is necessary.

The lateral motion, resulting from the swinging back and forth of the carrying arm 39 and its attachments, causes the cutting wheel 45 to sweep back and forth across the stump. The teeth on the wheel 45 chip the stump into small pieces in a manner common to all cutter devices of this type. Because of the offset location of the teeth 56, 56' and 57, the chipping speed is enhanced and each pass across the stump may be done quickly. At each successive pass, the cutting wheel may be lowered by use of the hydraulic device 41 until the stump is completely destroyed.

Thus, I have provided a device easy to transport; a mobile and compact device easy to position in a working position; and an efficient device, easy to operate and quick to dispose of the stump to be cut up.

I claim as my invention:

1. A self-propelled stump cutter comprising a frame, wheels on said frame adapted to carry the frame, motive means on said frame, drive means engaged between said motive means and at least one of said wheels whereby said wheel can be driven to propel said frame, steering means connected to at least one of said wheels whereby the stump cutter can be steered, cutting means movably mounted on said frame vertical and transverse movement relative to the frame, master motive means on said frame and drive means connected between said master motive means and said cutting means to cause said movement.

2. The device of claim 1 in which at least two wheels on said frame are widely spread apart for stability, pivotal means connecting said two wheels to said frame whereby said wheels can be pivoted from a widespread outer position to a narrower inner position for maneuvering into narrow spaces.

3. The device of claim 1 in which said cutting means includes a cutting wheel, having cutting wheel drive means engaged between said cutting wheel and said master motive means.

4. The device of claim 1 in which said steering means includes a steering axle pivotally connected to said frame, some of said wheels being mounted on said axle, said first named motive means also being mounted on said axle in driving relation to said wheels on said axle whereby the entire stump cutting means is propelled.

5. The device of claim 3 in which a plate is mounted for pivotal motion on said frame about a vertical axis, and arm means which are pivotally mounted on said plate for pivotal movement about a horizontal axis thereby providing vertical movement of the end of said arm means, said cutting wheel being mounted on said arm means.

6. The device of claim 5 in which the positions of said plate relative to said frame and said arm means relative to said plate are controlled by powered means connected to said plate and said arm means respectively whereby said plate and said arm means are moved.

7. The device of claim 5 in which said master motive means is mounted on said arm means and is in direct driving connection with said cutting wheel.

8. The device of claim 5 in which said arm means is a telescoping arm including two telescoping sections and power means is engaged to said two sections to slide one section relative to the other.

9. The device of claim 6 in which said arm means is a telescoping arm including two telescoping sections and power means is engaged to said two sections to slide one section relative to the other.

10. The device of claim 9 in which said master motive means provides hydraulic power and said motive means connected to said wheels is a hydraulic device, and in which said steering means includes a hydraulic device connected between said frame and said axle, and in which said powered means operably related to said plate and said arm means are hydraulic devices and said power means engaged to said two telescoping sections includes a hydraulic device.

11. The device of claim 10 in which all of said hydraulic devices are controlled by control means on a single master control panel and said master motive means is also controlled from said control panel.

12. The device of claim 3 in which said cutting wheel includes cutting teeth on its periphery.

13. The device of claim 12 in which said teeth include teeth offset from the plane of the wheel so that one group of teeth are mounted on one side of said plane, another group are mounted on the opposite side of said plane, and a third group are mounted in the plane of the wheel.

14. A cutting wheel for a stump cutter comprising:
a disk;
a first set of cutting teeth mounted to each side of the cutting disk in opposing pairs, wherein each one of said first set of cutting teeth is positioned parallel to the plane of the cutting wheel; and
a second set of cutting teeth mounted between each side of the cutting disk in opposing pairs, wherein each one of said second set of cutting teeth is positioned in the same plane as the cutting wheel and embedded in the cutting wheel, and further wherein each opposing pair of said second set provides a cutting surface substantially the width of the cutting wheel, such that said first set and said second second set provide a continuous cutting surface across the width of the cutting wheel.

15. The apparatus according to claim 14 wherein:
said first set includes four cutting teeth.

16. The apparatus according to claim 14 wherein:
said second set includes two cutting teeth.

* * * * *

REEXAMINATION CERTIFICATE (3263rd)

United States Patent [19]

Eilertson

[11] B1 4,690,183
[45] Certificate Issued Jul. 15, 1997

[54] SELF-PROPELLED STUMP CUTTER

[76] Inventor: Donald M. Eilertson, 1109 Trinidad La., Garland, Tex. 75040

Reexamination Request:
No. 90/003,622, Nov. 4, 1994

Reexamination Certificate for:
Patent No.: 4,690,183
Issued: Sep. 1, 1987
Appl. No.: 791,734
Filed: Oct. 28, 1985

[51] Int. Cl.$^6$ ................................................ A01G 23/06
[52] U.S. Cl. ........................ 144/24.12; 37/302; 144/334
[58] Field of Search ............................ 144/2 N, 34 R, 144/334, 24.12, 34.1; 241/101.72, 101.74; 30/379; 37/301, 302, 303, 94; 83/483, 493

[56] References Cited

U.S. PATENT DOCUMENTS

| | | |
|---|---|---|
| 1,417,425 | 5/1922 | Thompson . |
| 2,435,192 | 2/1948 | Arsneau . |
| 2,524,466 | 10/1950 | Moss et al. . |
| 2,613,698 | 10/1952 | Gregson . |
| 2,691,392 | 10/1954 | Jacobs et al. . |
| 2,691,393 | 10/1954 | Jacobs et al. . |
| 2,787,298 | 4/1957 | Le Tourneau . |
| 2,848,081 | 8/1958 | Welsh et al. . |
| 2,912,022 | 11/1959 | Ver Ploeg et al. . |
| 3,198,224 | 8/1965 | Hiley . |
| 3,336,958 | 8/1967 | Carlton . |
| 3,568,740 | 3/1971 | Speakman . |
| 3,685,557 | 8/1972 | Groce . |
| 4,074,447 | 2/1978 | Shivers et al. . |
| 4,271,879 | 6/1981 | Shivers, Jr. et al. . |
| 4,402,352 | 9/1983 | Hodges . |
| 5,289,859 | 3/1994 | Minton, Jr. et al. ............ 144/2 N |

FOREIGN PATENT DOCUMENTS

996007   8/1976   Canada .

OTHER PUBLICATIONS

*Operator's Manual and Parts Lists: 618 Stump Cutter,* Vermeer Manufacturing Co., Pella, Iowa 50219, Apr. 1984.
CEI Mini Chief Self–Propelled Stump Cutter, "Product News", *Arbor Age* magazine, Apr. 1985, vol. 5, No. 1, p. 37.

*Primary Examiner*—W. Donald Bray

[57] ABSTRACT

A self-propelled stump cutter adapted to move under its own power to maneuver into small spaces where stumps might be located close to buildings or to other trees. The device includes a frame with a plurality of hydraulic means to steer the cutting wheel over the stump and to raise and lower the wheel. Hydraulic motors are also used to propel the device.

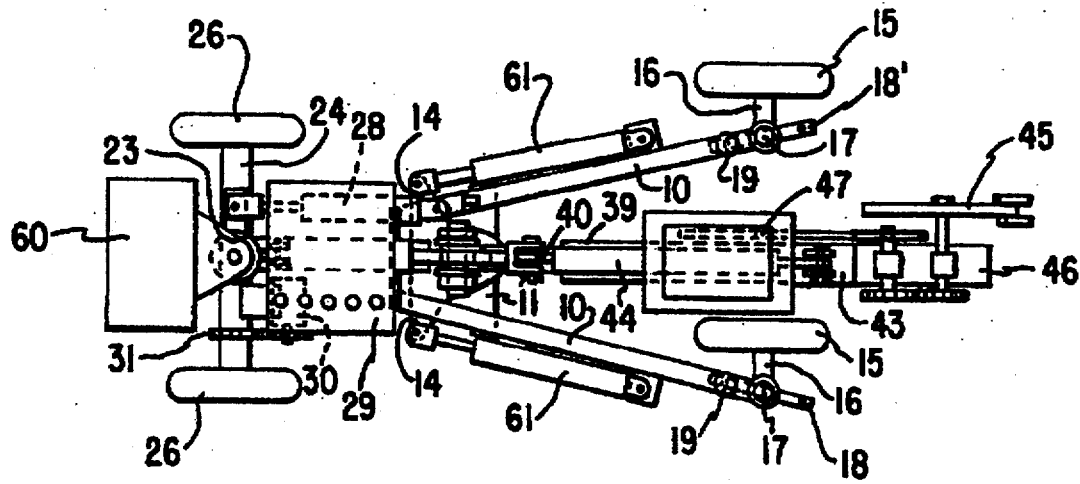

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2, 4–11 and 13–16 is confirmed.

Claims 1, 3 and 12 are cancelled.

* * * * *